(12) United States Patent
Harris

(10) Patent No.: US 11,397,361 B2
(45) Date of Patent: Jul. 26, 2022

(54) METHOD FOR MECHANICAL AND ELECTRICAL CONNECTION TO DISPLAY ELECTRODES

(71) Applicant: E Ink Corporation, Billerica, MA (US)

(72) Inventor: George G. Harris, Woburn, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 15/196,734

(22) Filed: Jun. 29, 2016

(65) Prior Publication Data

US 2016/0377951 A1 Dec. 29, 2016

Related U.S. Application Data

(60) Provisional application No. 62/186,044, filed on Jun. 29, 2015.

(51) Int. Cl.
| | |
|---|---|
| *G02B 26/00* | (2006.01) |
| *G02F 1/03* | (2006.01) |
| *G02F 1/15* | (2019.01) |
| *G03G 17/04* | (2006.01) |
| *G09G 3/19* | (2006.01) |
| *G09G 3/38* | (2006.01) |
| *G09G 3/34* | (2006.01) |
| *G02F 1/133* | (2006.01) |
| *G02F 1/167* | (2019.01) |
| *G02F 1/1676* | (2019.01) |

(Continued)

(52) U.S. Cl.
CPC .......... *G02F 1/167* (2013.01); *G02F 1/13452* (2013.01); *G02F 1/1676* (2019.01); *G02F 1/16753* (2019.01); *H01R 12/523* (2013.01); *G02F 2201/42* (2013.01); *G02F 2201/46* (2013.01); *H01R 4/06* (2013.01)

(58) Field of Classification Search
CPC ................... G02F 1/0123; G02F 1/167; G02F 2001/1678; G02F 1/172; G02F 2001/1672; G02F 1/07; G02B 26/026; G02B 26/001
USPC ........ 359/296, 265–277, 245–247, 254, 242; 430/31–32; 345/49, 105, 107; 438/929; 349/33
See application file for complete search history.

(56) References Cited

U.S. PATENT DOCUMENTS

| | | | |
|---|---|---|---|
| 4,418,346 A | 11/1983 | Batchelder | |
| 5,199,879 A * | 4/1993 | Kohn | ..................... H01R 24/58 |
| | | | 439/63 |

(Continued)

FOREIGN PATENT DOCUMENTS

| | | |
|---|---|---|
| EP | 1099207 | 5/2001 |
| EP | 1145072 | 10/2001 |
| WO | WO2000038000 | 6/2000 |

OTHER PUBLICATIONS

Wood, D., "An Electrochromic Renaissance?" Information Display, 18(3), 24 (Mar. 2002) Mar. 1, 2002.

(Continued)

*Primary Examiner* — Dawayne Pinkney
(74) *Attorney, Agent, or Firm* — Brian D. Bean

(57) ABSTRACT

An electro-optic display may comprise a front electrode having a first opening defined therein, a rear electrode having a second opening defined therein, an electro-optic layer between the front and rear electrodes and a rigid conductive component passing through the first and second openings and electrically contacting the front electrode but not the rear electrode.

11 Claims, 5 Drawing Sheets

(51) Int. Cl.
*H01R 12/52* (2011.01)
*G02F 1/1345* (2006.01)
*G02F 1/16753* (2019.01)
*H01R 4/06* (2006.01)

(56) References Cited

U.S. PATENT DOCUMENTS

| | | |
|---|---|---|
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,889,364 A | 3/1999 | McGuigan et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,252,564 B1 | 6/2001 | Albert et al. |
| 6,271,823 B1 | 8/2001 | Gordon, II et al. |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,376,828 B1 | 4/2002 | Comiskey |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,480,182 B2 | 11/2002 | Turner et al. |
| 6,498,114 B1 | 12/2002 | Amundson et al. |
| 6,506,438 B2 | 1/2003 | Duthaler et al. |
| 6,512,669 B1 | 1/2003 | Goodwin et al. |
| 6,518,949 B2 | 2/2003 | Drzaic |
| 6,521,489 B2 | 2/2003 | Duthaler et al. |
| 6,535,197 B1 | 3/2003 | Comiskey et al. |
| 6,545,291 B1 | 4/2003 | Amundson et al. |
| 6,639,578 B1 | 10/2003 | Comiskey et al. |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,724,519 B1 | 4/2004 | Morrison et al. |
| 6,750,473 B2 | 6/2004 | Amundson et al. |
| 6,788,449 B2 | 9/2004 | Liang et al. |
| 6,816,147 B2 | 11/2004 | Albert |
| 6,819,471 B2 | 11/2004 | Amundson et al. |
| 6,825,068 B2 | 11/2004 | Denis et al. |
| 6,825,829 B1 | 11/2004 | Albert et al. |
| 6,831,769 B2 | 12/2004 | Holman et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,865,010 B2 | 3/2005 | Duthaler et al. |
| 6,866,760 B2 | 3/2005 | Paolini Jr. et al. |
| 6,870,657 B1 | 3/2005 | Fitzmaurice et al. |
| 6,922,276 B2 | 7/2005 | Zhang et al. |
| 6,950,220 B2 | 9/2005 | Abramson et al. |
| 6,967,640 B2 | 11/2005 | Albert et al. |
| 6,980,196 B1 | 12/2005 | Turner et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,030,412 B1 | 4/2006 | Drzaic et al. |
| 7,075,502 B1 | 7/2006 | Drzaic |
| 7,075,703 B2 | 7/2006 | O'Neil et al. |
| 7,106,296 B1 | 9/2006 | Jacobson |
| 7,110,163 B2 | 9/2006 | Webber et al. |
| 7,116,318 B2 | 10/2006 | Amundson et al. |
| 7,148,128 B2 | 12/2006 | Jacobson |
| 7,167,155 B1 | 1/2007 | Albert et al. |
| 7,173,752 B2 | 2/2007 | Doshi et al. |
| 7,176,880 B2 | 2/2007 | Amundson et al. |
| 7,190,008 B2 | 3/2007 | Amundson et al. |
| 7,206,119 B2 | 4/2007 | Honeyman et al. |
| 7,223,672 B2 | 5/2007 | Kazlas et al. |
| 7,230,751 B2 | 6/2007 | Whitesides et al. |
| 7,236,291 B2 | 6/2007 | Kaga et al. |
| 7,236,292 B2 | 6/2007 | LeCain |
| 7,256,766 B2 | 8/2007 | Albert et al. |
| 7,259,744 B2 | 8/2007 | Arango et al. |
| 7,280,094 B2 | 10/2007 | Albert |
| 7,312,784 B2 | 12/2007 | Baucom et al. |
| 7,321,459 B2 | 1/2008 | Masuda et al. |
| 7,327,511 B2 | 2/2008 | Whitesides et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Denis et al. |
| 7,382,363 B2 | 6/2008 | Albert et al. |
| 7,388,572 B2 | 6/2008 | Duthaler et al. |
| 7,411,719 B2 | 8/2008 | Paolini, Jr. et al. |
| 7,420,549 B2 | 9/2008 | Jacobson et al. |
| 7,442,587 B2 | 10/2008 | Amundson et al. |
| 7,443,571 B2 | 10/2008 | LeCain et al. |
| 7,453,445 B2 | 11/2008 | Amundson |
| 7,492,497 B2 | 2/2009 | Paolini, Jr. et al. |
| 7,513,813 B2 | 4/2009 | Paolini, Jr. et al. |
| 7,535,624 B2 | 5/2009 | Amundson et al. |
| 7,551,346 B2 | 6/2009 | Fazel et al. |
| 7,554,712 B2 | 6/2009 | Patry et al. |
| 7,583,427 B2 | 9/2009 | Danner et al. |
| 7,598,173 B2 | 10/2009 | Ritenour et al. |
| 7,605,799 B2 | 10/2009 | Amundson et al. |
| 7,636,191 B2 | 12/2009 | Duthaler |
| 7,649,666 B2 | 1/2010 | Isobe et al. |
| 7,649,674 B2 | 1/2010 | Danner et al. |
| 7,667,886 B2 | 2/2010 | Danner et al. |
| 7,672,040 B2 | 3/2010 | Sohn et al. |
| 7,679,814 B2 | 3/2010 | Paolini, Jr. et al. |
| 7,688,497 B2 | 3/2010 | Danner et al. |
| 7,728,811 B2 | 6/2010 | Albert et al. |
| 7,729,039 B2 | 6/2010 | LeCain et al. |
| 7,733,335 B2 | 6/2010 | Zehner et al. |
| 7,785,988 B2 | 8/2010 | Amundson et al. |
| 7,791,782 B2 | 9/2010 | Paolini, Jr. et al. |
| 7,826,129 B2 | 11/2010 | Wu et al. |
| 7,839,564 B2 | 11/2010 | Whitesides et al. |
| 7,843,621 B2 | 11/2010 | Danner et al. |
| 7,843,624 B2 | 11/2010 | Danner et al. |
| 7,843,626 B2 | 11/2010 | Amundson et al. |
| 7,859,637 B2 | 12/2010 | Amundson et al. |
| 7,893,435 B2 | 2/2011 | Kazlas et al. |
| 7,898,717 B2 | 3/2011 | Patry et al. |
| 7,957,053 B2 | 6/2011 | Honeyman et al. |
| 7,986,450 B2 | 7/2011 | Cao et al. |
| 8,009,344 B2 | 8/2011 | Danner et al. |
| 8,009,348 B2 | 8/2011 | Zehner et al. |
| 8,027,081 B2 | 9/2011 | Danner et al. |
| 8,034,209 B2 | 10/2011 | Danner et al. |
| 8,049,947 B2 | 11/2011 | Danner et al. |
| 8,068,272 B2 | 11/2011 | LeCain et al. |
| 8,077,141 B2 | 12/2011 | Duthaler et al. |
| 8,077,381 B2 | 12/2011 | LeCain et al. |
| 8,089,453 B2 | 1/2012 | Comiskey et al. |
| 8,177,942 B2 | 5/2012 | Paolini, Jr. et al. |
| 8,208,193 B2 | 6/2012 | Patry et al. |
| 8,319,759 B2 | 11/2012 | Jacobson et al. |
| 8,373,211 B2 | 2/2013 | Amundson et al. |
| 8,389,381 B2 | 3/2013 | Amundson et al. |
| 8,390,301 B2 | 3/2013 | Danner et al. |
| 8,482,835 B2 | 7/2013 | LeCain |

(56) References Cited

U.S. PATENT DOCUMENTS

| | | |
|---|---|---|
| 8,498,042 B2 | 7/2013 | Danner et al. |
| 8,610,988 B2 | 12/2013 | Zehner et al. |
| 8,728,266 B2 | 5/2014 | Danner et al. |
| 8,754,859 B2 | 6/2014 | Gates et al. |
| 8,786,929 B2 | 7/2014 | LeCain et al. |
| 8,830,553 B2 | 9/2014 | Patry et al. |
| 8,854,721 B2 | 10/2014 | Danner et al. |
| 8,891,155 B2 | 11/2014 | Danner et al. |
| 8,969,886 B2 | 3/2015 | Amundson |
| 8,970,810 B2 | 3/2015 | Bowser et al. |
| 8,994,705 B2 | 3/2015 | Jacobson et al. |
| 9,075,280 B2 | 7/2015 | Whitesides |
| 9,152,003 B2 | 10/2015 | Danner et al. |
| 9,152,004 B2 | 10/2015 | Paolini, Jr. et al. |
| 9,238,340 B2 | 1/2016 | Kayal et al. |
| 9,310,661 B2 | 4/2016 | Wu et al. |
| 2002/0060321 A1 | 5/2002 | Kazlas et al. |
| 2004/0105036 A1 | 6/2004 | Danner et al. |
| 2004/0140821 A1* | 7/2004 | Lee .................. G01R 1/06722 324/754.14 |
| 2005/0122306 A1 | 6/2005 | Wilcox et al. |
| 2005/0122563 A1 | 6/2005 | Honeyman et al. |
| 2005/0275923 A1 | 12/2005 | Park |
| 2007/0052757 A1 | 3/2007 | Jacobson |
| 2008/0274645 A1 | 11/2008 | Yohn et al. |
| 2009/0122389 A1 | 5/2009 | Whitesides et al. |
| 2009/0168067 A1 | 7/2009 | LeCain et al. |
| 2009/0315044 A1 | 12/2009 | Amundson et al. |
| 2010/0061195 A1* | 3/2010 | Kanbayashi ............ G02F 1/167 368/239 |
| 2011/0140744 A1 | 6/2011 | Kazlas et al. |
| 2011/0164301 A1 | 7/2011 | Paolini, Jr. et al. |
| 2011/0187683 A1 | 8/2011 | Wilcox et al. |
| 2011/0187689 A1 | 8/2011 | Bishop |
| 2011/0292319 A1 | 12/2011 | Cole |
| 2012/0293858 A1 | 11/2012 | Telfer et al. |
| 2013/0278900 A1 | 10/2013 | Hertel et al. |
| 2014/0078024 A1 | 3/2014 | Paolini, Jr. et al. |
| 2014/0115884 A1 | 5/2014 | Danner et al. |
| 2014/0139501 A1 | 5/2014 | Amundson |
| 2014/0211129 A1* | 7/2014 | Bowser ............... G02F 1/13336 349/73 |
| 2014/0300837 A1 | 10/2014 | Gates et al. |
| 2014/0340738 A1 | 11/2014 | LeCain et al. |
| 2015/0171112 A1 | 6/2015 | Amundson et al. |
| 2015/0205178 A1 | 7/2015 | Paolini, Jr. et al. |
| 2015/0226986 A1 | 8/2015 | Paolini, Jr. et al. |
| 2015/0227018 A1 | 8/2015 | Paolini, Jr. et al. |
| 2015/0228666 A1 | 8/2015 | Paolini, Jr. |
| 2015/0261057 A1 | 9/2015 | Harris et al. |
| 2016/0276630 A1* | 9/2016 | Farrnbacher ........ H01L 51/5203 |

OTHER PUBLICATIONS

O'Regan, B. et al., "A Low Cost, High-efficiency Solar Cell Based on Dye-sensitized colloidal TiO2 Films", Nature, vol. 353, Oct. 24, 1991, 737-740 Oct. 24, 1991.

Bach, U., et al., "Nanomaterials-Based Electrochromics for Paper-Quality Displays", Adv. Mater, 14(11), 845 (2002) Jun. 5, 2002.

Hayes, R.A., et al., "Video-Speed Electronic Paper Based on Electrowetting", Nature, vol. 425, Sep. 25, pp. 383-385 (2003) Sep. 25, 2003.

Kitamura, T., et al., "Electrical toner movement for electronic paper-like display", Asia Display/IDW '01, p. 1517, PaperHCS1-1 (2001) Jan. 1, 2001.

Yamaguchi, Y., et al., "Toner display using insulative particles charged triboelectrically", Asia Display/IDW '01, p. 1729, Paper AMD4-4 (2001) Jan. 1, 2001.

Korean Intellectual Property Office, PCT/US2016/040054, International Search Report and Written Opinion, dated Sep. 30, 2016, dated Sep. 30, 2016.

European Patent Office, EP Appl. No. 16818666.6, Extended European Search Report, dated Feb. 22, 2019.

* cited by examiner

METHOD FOR MECHANICAL AND ELECTRICAL CONNECTION TO DISPLAY ELECTRODES

REFERENCE TO RELATED APPLICATIONS

This application claims benefit of Provisional Application Ser. No. 62/186,044, filed Jun. 29, 2015.

BACKGROUND OF INVENTION

This invention relates to mechanical and electrical connections for electro-optic displays, and to methods for assemble such displays. The connection means of the present invention are especially, but not exclusively, intended for use with particle-based electrophoretic displays in which one or more types of electrically charged particles are suspended in a liquid and are moved through the liquid under the influence of an electric field to change the appearance of the display.

Connection means such as rivets and bolts are frequently used a mechanical and electrical connectors on printed circuit boards (PCB). For example, rivets are used as low cost solder free option requiring minimal time and labor. The material and labor cost of bolts and/or nuts can be higher, but they allow for later disassembly and repair.

Currently used methods to assemble an electro-optic display to a PCB can be expensive and time consuming. The subject matter disclosed herein permits the assembly of PCBs to electro-optic displays cheaply and conveniently.

SUMMARY OF INVENTION

According to an aspect of the present application, an electro-optic display is provided, comprising a front electrode, the front electrode having a first opening defined therein, and a rear electrode, the rear electrode having a second opening defined therein. The electro-optic display further comprises an electro-optic layer between the front and rear electrodes. The electro-optic display further comprises a rigid conductive component passing through the first and second openings and electrically contacting the front electrode but not the rear electrode. In some embodiments, an additional rigid conductive component passes through the front and rear electrodes but electrically contacts contacting the front electrode but not the rear electrode. The rigid conductive components may be used to electrically control the front and rear electrodes of the electro-optic display.

According to an aspect of the present application, a method of manufacturing an electro-optic display having a front electrode, a rear electrode, and an electro-optic layer disposed between the front and rear electrodes is provided. The method comprises inserting a rigid conductive component through an opening in the front electrode and an opening in the rear electrode, and affixing the rigid conductive component to the front electrode and a printed circuit board after inserting the rigid conductive component.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1A:
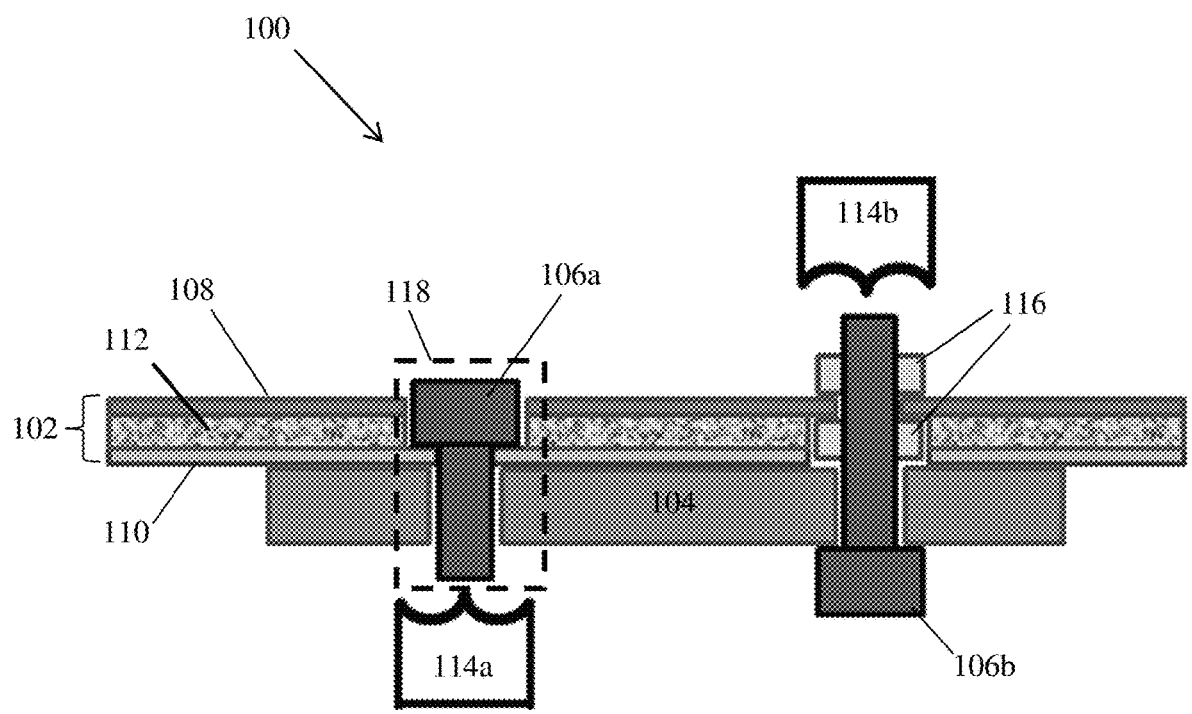
FIG. 1A illustrates an apparatus including connectors providing both electrical and mechanical interconnection to an electro-optic display, according to a non-limiting embodiment of the present application.

Aspects of the present application relate to connectors for electro-optic displays providing both mechanical and electrical interconnection, with at least some aspects providing a connector configured to pass through opposing electrodes of the electro-optic display while providing electrical connection between one of the electrodes and a control circuit (also referred to herein as a "driver circuit"). Some electro-optic displays include two, opposing electrodes between which is an electro-optic layer, such as an electrophoretic layer. The optical state of the electro-optic layer may be controlled by application of suitable signals, such as voltages, to the electrodes. Aspects of the present application relate to connectors which provide electrical connection to one or both of the electrodes. In some embodiments, the connector may be a rigid, conductive connector, such as a rivet or a bolt. The connector may pass through both electrodes but electrically contact only one of the electrodes. Thus, use of two or more such connectors may allow for distinct electrical control of the two electrodes.

According to an aspect of the present application, a method of manufacturing an electro-optic display is provided. The electro-optic display may include two, opposed electrodes between which is disposed an electro-optic layer. The method of manufacture may include forming an opening in the two electrodes and the electro-optic layer and inserting a rigid, conductive connector into the opening. The connector may be positioned to mechanically and electrically contact one of the two electrodes. The connector may, in some embodiments, also couple to a printed circuit board ("PCB") holding control electronics for the electro-optic display, such that the connector may mechanically and electrically couple one of the electrodes of the electro-optic display to the PCB.

The connectors described herein according to various aspects of the present application may alternatively be labeled herein as "conductive components," "couplers," or "fasteners."

The aspects and embodiments described above, as well as additional aspects and embodiments, are described further below. These aspects and/or embodiments may be used individually, all together, or in any combination of two or more, as the application is not limited in this respect.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase.

Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 6,922,276; and 7,411,719;

(c) Films and sub-assemblies containing electro-optic materials; see for example U.S. Pat. Nos. 6,825,829; 6,982,178; 7,236,292; 7,443,571; 7,513,813; 7,561,324; 7,636,191; 7,649,666; 7,728,811; 7,729,039; 7,791,782; 7,839,564; 7,843,621; 7,843,624; 8,034,209; 8,068,272; 8,077,381; 8,177,942; 8,390,301; 8,482,835; 8,786,929; 8,830,553; 8,854,721; and 9,075,280; and U.S. Patent Applications Publication Nos. 2009/0109519; 2009/0168067; 2011/0164301; 2014/0027044; 2014/0115884; and 2014/0340738;

(d) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,327,511; 7,349,148; 7,352,353; 7,365,394; 7,365,733; 7,382,363; 7,388,572; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; 7,785,988; 7,843,626; 7,859,637; 7,893,435; 7,898,717; 7,957,053; 7,986,450; 8,009,344; 8,027,081; 8,049,947; 8,077,141; 8,089,453; 8,208,193; 8,373,211; 8,389,381; 8,498,042; 8,610,988; 8,728,266; 8,754,859; 8,830,560; 8,891,155; 8,969,886; 9,152,003; and 9,152,004; and U.S. Patent Applications Publication Nos. 2002/0060321; 2004/0105036; 2005/0122306; 2005/0122563; 2007/0052757; 2007/0097489; 2007/0109219; 2009/0122389; 2009/0315044; 2011/0026101; 2011/0140744; 2011/0187683; 2011/0187689; 2011/0292319; 2013/0278900; 2014/0078024; 2014/0139501; 2014/0300837; 2015/0171112; 2015/0205178; 2015/0226986; 2015/0227018; 2015/0228666; and 2015/0261057; and International Application Publication No. WO 00/38000; European Patents Nos. 1,099,207 B1 and 1,145,072 B1;

(e) Color formation and color adjustment; see for example U.S. Pat. Nos. 7,075,502 and 7,839,564;

(f) Methods for driving displays; see for example U.S. Pat. Nos. 7,012,600; and 7,453,445;

(g) Applications of displays; see for example U.S. Pat. Nos. 7,312,784; and 8,009,348; and (h) Non-electrophoretic displays, as described in U.S. Pat. Nos. 6,241,921; 6,950,220; 7,420,549 8,319,759; and 8,994,705 and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface. Other types of electro-optic media may also be used in the displays of the present invention.

FIG. 1A illustrates an example of an apparatus to which aspects of the present application may apply. The apparatus includes an electro-optic display and two connectors, according to a non-limiting embodiment. In the illustrated embodiment, each of the two connectors provides both mechanical and electrical coupling, as will be described.

As shown, the apparatus 100 includes a display 102, a printed circuit board ("PCB") 104, and connectors 106a and 106b. The display 102 includes a front conductive film such as front electrode 108, a rear conductive film such as rear electrode 110, and an electro-optic layer 112, and thus may be an electro-optic display. In some embodiments the electro-optic layer 112 may be an electrophoretic layer, an example of which is described below in connection with FIG. 2.

The front electrode 108 and/or rear electrode 110 may be flexible, providing flexibility to the display 102. For example, the front electrode 108 and/or rear electrode 110 may be formed of indium tin oxide ("ITO") applied on a substrate, such as a substrate of polyethylene terephthalate ("PET"). At suitably thin dimensions, the ITO and substrate may be flexible. In such situations, the ITO and substrate thickness may be less than 15 mil, less than 10 mil, or any value within those ranges, or any other value providing desired flexibility in those situations in which a flexible display is desired. Also, the front electrode 108 may represent a viewing side of the display and, thus, use of ITO may be beneficial since an ITO electrode may be transparent. Still, other electrode materials may be used as alternatives.

As with the front and rear electrodes themselves, any substrates for the electrodes may be formed of a material and with a dimension providing desired flexibility. Dimensions similar to those listed above for the front and rear electrodes may be used for any substrates. For ease of illustration, the substrates are not illustrated separately in FIG. 1A.

The front electrode 108 and/or rear electrode 110 may be controlled by control circuitry on the PCB 104 to generate an electric field in (or across) the electro-optic layer 112. The control circuitry may apply suitable voltages to the front electrode 108 and/or rear electrode 110 to create a desired response from the electro-optic layer 112. The circuitry on the PCB 104 may be driver circuitry, and may include discrete electrical components and/or at least some integrated circuitry, as the various aspects described herein are not limited to any particular implementation of the control circuitry on the PCB 104.

In the non-limiting example of FIG. 1A, each of the connectors 106a and 106b is a rivet, although alternatives are possible, some of which are described below. As shown, each connector 106a and 106b passes through the front electrode 108 and rear electrode 110, as well as the electro-optic layer 112. The configuration of the connector 106a is now described.

The front electrode 108, rear electrode 110, and electro-optic layer 112 all have an opening formed therein, allowing the connector 106a to pass through. More specifically, an opening of a first dimension is formed in the front electrode 108 and the electro-optic layer 112, wherein the dimension may be considered a diameter for purposes of illustration. Aligned with the opening in the front electrode 108 is an opening in the rear electrode 110 of a second dimension, smaller than the first dimension. The openings in the front electrode 108 and rear electrode 110 may share a common axis and be concentric when viewed from the side of display 102 proximate the front electrode 108.

Additionally, the PCB 104 includes an opening therein, through which the connector 106a passes. The opening may be a plated thru-hole providing electrical conductivity from one side of the PCB 104 to the other, although not all embodiments are limited in this respect.

Figure 1B:
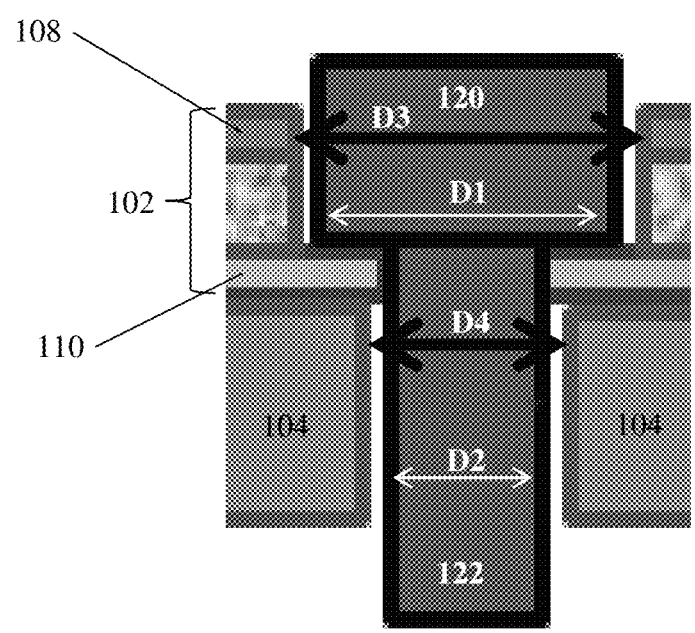
FIG. 1B illustrates a detailed view of a portion of the apparatus of FIG. 1A.

FIG. 1B provides a close-up view of the portion of FIG. 1A outlined by dashed box 118. As shown, the connector 106a is a rivet including a head portion 120 and a shaft 122. The head portion 120 has a diameter D1 and the shaft 122 has a diameter D2. Although the term "diameter" is used herein, it should be appreciated that more generally the terms "length" or "dimension" may be used, and that the various aspects described herein are not limited to using components that have a "diameter" as non-cylindrical and other shaped connectors may be used. As shown in FIG. 1B, the diameter D1 is smaller than the diameter D3 of the opening in the front electrode 108 and electro-optic layer 112. Therefore, the connector 106 does not mechanically or electrically contact the front electrode 108 and electro-optic layer 112. The head portion 120 does contact the rear electrode 110, in this case by resting flush against an upper surface of the rear electrode 110 proximate the electro-optic layer 112. The diameter D2 of the shaft 122 is smaller than the diameter D4 of the opening in the PCB 104. However, in some embodiments the diameters D2 and D4 may be substantially the same such that the outer surface of the shaft 122 may contact the opening in the PCB 104. To form a stable mechanical connection, the shaft 122 may be swaged, for example using a swage tool 114a as shown in FIG. 1A. The shaft 122 may therefore come into contact with the PCB 104, and effectively clamp the PCB 104 to the rear electrode 110.

As previously described, the connectors 106a and 106b may be conductive. Thus, it should be appreciated from the foregoing description that the connector 106a may provide electrical interconnection of the rear electrode 110 and the circuitry on the PCB 104.

Referring again to FIG. 1A, the connector 106b may be configured to provide mechanical and electrical interconnection of the PCB 104 and the front electrode 108. As shown, the front electrode 108 includes an opening in the vicinity of connector 106b and though which the connector 106b passes. Similarly, the rear electrode 110 and the electro-optic layer 112 include openings which can accommodate the connector 106b. The opening in the front electrode 108 is smaller than the opening in the rear electrode 110 and electro-optic layer 112. As a result, the connector 106b may mechanically and electrically contact the front electrode 108 but not the rear electrode 110 or electro-optic layer 112. The connector 106b is, in this non-limiting example, a rivet, and may be positioned such that its head portion contacts the PCB 104 while its shaft extends through the front electrode 108. To fasten the connector 106b, a swage tool 114b may be used to swage the shaft in the vicinity of the front electrode 108. Optionally, washers 116 may be included to provide load distribution and ensure good electrical connection. In some embodiments, adhesives may be used instead of the washers 116. For example, a pressure sensitive adhesive filled with conductive material such as carbon or metal particles may be used to provide load distribution and ensure good electrical connection between the rivet and the front 108 or rear 110 electrodes. When applied, the adhesive should preferably conform to any space between the connector 106a, 106b and the front 108 or rear 110 electrodes. The adhesive thickness can match or exceed any variability in the connector flatness to ensure a good, uniform electrical connection between the connector and the electrodes. For irregular gaps or applications with mechanical movements between the connector and the electrodes, the adhesive used can be an isotropic conductive (i.e., conductive in all directions) material. For application with well controlled or even gaps and minimal movements between the connector and the electrodes, an anisotropic conductive adhesive may be used (i.e., not conductive laterally in the adhesive film, but conductive vertically through its thickness). Some of the anisotropical conductive adhesives that can be used can have metal or metal particles having 1 to 100 micron diameters.

Referring now to FIG. 1B, in some embodiments, an anisotropical adhesive can be applied between the rivet's head portion 120 and the rear electrode 110. In this embodiment, the adhesive thickness may preferably be high enough to provide at least one electrical connection between the head portion 120 and the rear electrode 110, but low enough to avoid particle to particle contact which could result in an electrical short between the head portion 120 and the front electrode 108, were it to flow out from between the head portion 120 and the rear electrode 110.

Another type of adhesive may be used are thermoset materials, which may also be filled with conductive material such as carbon or metal particles. This uncured resin may be of sufficiently high viscosity so as to not flow onto neighboring electrodes where it can cause an electrical short. And as with the pressure sensitive adhesives, the thermosetting adhesive can also be designed to be anisotropically conductive. This adhesive can be either dispensed into the contact area or onto the connector prior to insertion through the display film.

Yet another type of adhesive may be used are thermoplastic materials. A thermoplastic material can function both as a connector (e.g., rivet 116) and the adhesive of a tool (e.g., tool 114a or 114b) can be heated to melt and fuse the thermoplastic material onto the electrode surface. The thermoplastic material should be preferably isotropically conductive to provide a conductive path through the length of the connector as well as through the fused contact area. The thermoplastic material can be provided as a rod of constant diameter to be inserted through the display 102 and the PCB 104, then melted and fused on both ends to provide both mechanical and electrical connections. Alternatively, the thermoplastic material can be provided a molded part in the shape similar to that of the head portion 106a and inserted through the display 102 and PCB 104, then subsequently melted and fused only on the small diameter end (e.g., by a heated tool for example). Either way, additional mechanical and/or electrical connection hardware can be used into the thermoplastic material as well.

In a preferred embodiment, when a display has been completely assembled, the adhesive material should not flow or creep during the lifetime of the display, as such flow can result in a loss of electrical connection between the connectors and the electrodes, or conversely, such flow can result in a short circuit between the connector and the an opposing electrodes (e.g., electrode 108 and connector 106a of FIG. 1) or between the front and rear electrodes (electrodes 108 and 110 of FIG. 1). For any given contact area between the electrode and the connector, the through thickness resistivity of the adhesive should be no more than 1000 Ohms, preferably less than 100 Ohms.

Thus, the configuration of the apparatus 100 provides electrical connection between the circuitry on the PCB 104 and the front electrode 108 via the connector 106a and between the circuitry on the PCB 104 and the rear electrode 110 via the connector 106b. As a result, the electrode layers may be separately controlled (driven) with suitable signals generated by the circuitry on the PCB 104. Also, as described, the connectors 106a and 106b may serve to clamp the display 102 to the PCB 104.

Figure 4A:
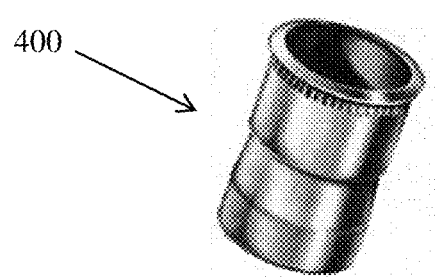
FIG. 4A illustrates an example of a threaded insert rivet which may be used as a connector for connecting components of an electro-optic display, according to aspects of the present application.
Figure 4B:
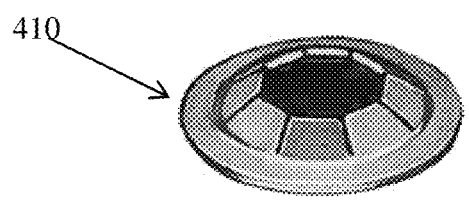
FIG. 4B illustrates an example of a pushnut which may be used as part of a connection connecting components of an electro-optic display, according to aspects of the present application.

The connectors 106a and 106b may be any suitable connectors. As shown in FIG. 1, the connectors may be rivets in some embodiments. Various types of rivets may be used, including standard rivets, pop rivets, and threaded insert rivets, an example of which is illustrated as item 400 in FIG. 4A. If threaded insert rivets are used, a screw or other conductive piece may be threaded into the rivet to provide the electrical connection. In other embodiments, the connector 106a and/or the connector 106b may include a nut and bolt. The bolt may be used to fixedly attach the nut to the display 102 without the need for a swage tool. As a further alternative, a rod and pushnut may be used. The rod may be inserted into the display 102 (as shown in FIG. 1A with the illustrated connectors 106a and 106b) and a pushnut fastened to the protruding end to clamp the rod in place. An example of pushnut 410 is shown in FIG. 4B. A further option is to use an adhesive (e.g., conductive glue) which could be used to substantially fill the openings in the front electrode, electro-optic layer, rear electrode, and PCB, being careful not to electrically short circuit the front and rear electrodes. Optionally, a conductive rod could be inserted into the glue prior to curing to provide greater stability. Other types of connectors may alternatively be used.

More generally, the connectors, such as connectors 106a and 106b, should be conductive and have suitable mechanical strength. The connectors should be conductive to provide the previously-described electrical connection between the circuitry on the PCB and the front and/or rear electrodes of the display. The connectors may therefore be made of a conductive material, may be made of a non-conductive material that is coated in a conductive material, or may have contact points coated in conductive material. Examples of conductive materials include metal, but the application is not limited to using metal connectors or connectors coated in metal.

Conductive materials may be use to supplement the connections between the connectors 106a and 106b and the front and rear electrodes of the display 102. For example, conductive adhesive, conductive tape, or conductive glue may be added at the connection points to enhance the electrical connection.

In the embodiment of FIG. 1A, the connectors 106a and 106b directly connect the PCB 104 with the front electrode 108 and rear electrode 110, respectively. However, in some embodiments, control circuitry may be provided remotely from the PCB 104, or the PCB 104 may not be included at all. In such situations, the connectors 106a and 106b may be only a part of an electrical path from the control circuitry to the front and rear electrodes. For example, wires may connect the connectors 106a and 106b to the control circuitry.

The connectors should also have suitable mechanical strength. The connectors may be sufficiently strong to support the weight of the PCB 104 and/or the display 102. For instance, in situations in which the display 102 is to be hung, for example from a ceiling or wall, the connectors may need to be sufficiently strong to support the weight of the display 102. Optionally, areas surrounding the connectors 106a and 106b may be reinforced with non-conductive materials to provided added mechanical strength.

The electro-optic displays described herein may have any suitable dimensions, and in some embodiments may be small. For example, the display 102 may be small in at least some embodiments, which may contribute to its flexible nature. For example, each of the front electrode 108 and rear electrode 110 may be between 1 mil (thousandth of an inch) and 10 mil, such as 5 mil each, or between 0.1 mm and 0.5 mm. The electro-optic layer 112 may be between 0.5 mil and 5 mil, such as 1 mil, or between approximately 0.03 mm and 0.06 mm. Thus, in some embodiments, the display 102 may have a total thickness of approximately 10-15 mil, or between approximately 0.2 mm and 0.4 mm. The listed examples of dimensions are non-limiting, as other dimensions may be used.

The connectors 106a and 106b may have any suitable dimensions. In some embodiments, the dimensions may be small to minimize the intrusion of the connectors on the display. Referring to FIG. 1B, non-limiting examples are now provided. The diameter D1 may be between 2.5 mm and 6.5 mm (e.g., 2.69 mm, 5.12 mm, or 6.25 mm). The diameter D2 may be between 1.5 mm and 3.5 mm (e.g., 1.5 mm, 3.11 mm, or 3.15 mm). The diameter D3 may be slightly larger than D1, for example by half a millimeter to one millimeter. Similarly, the diameter D4 may be slightly larger than D2 in some embodiments. It should be appreciated that all these dimensions are provided for purposes of illustration, and are not limiting unless otherwise stated.

An example of an electro-optic layer of the type illustrated in FIG. 1A is now described. In some embodiments, the electro-optic layer may be an electrophoretic layer.

Figure 2:
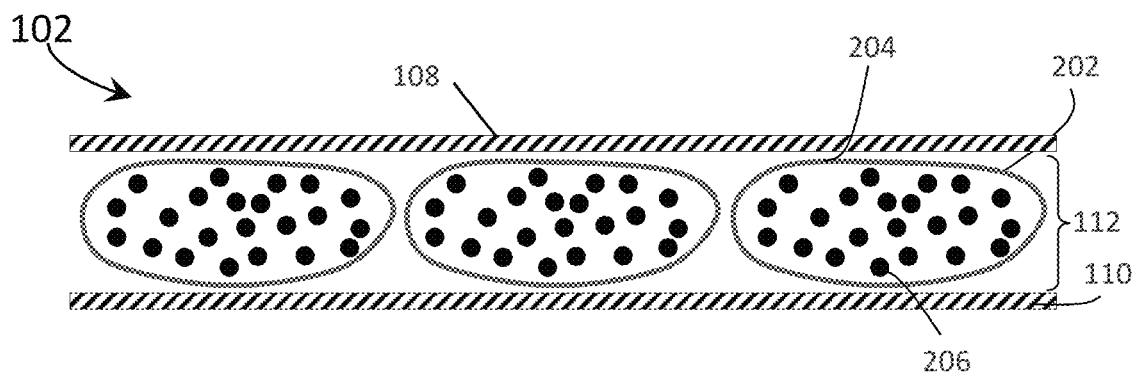
FIG. 2 illustrates an example of an electrophoretic layer which may be used as an electro-optic layer of an electro-optic display, according to a non-limiting embodiment.

Referring to FIG. 2, the electro-optic layer 112, shown in cross-section, may comprise a plurality of capsules 202 each having a capsule wall 204 surrounding fluid and electrophoretic particles 206 suspended in the fluid. The electrophoretic particles 206 may be electrically charged and responsive to an electric field created by the front electrode 108 and rear electrode 110. Examples of suitable electrophoretic layers are described in U.S. Pat. Nos. 6,982,178 and 7,513,813, which are incorporated herein by reference in their entireties.

While FIG. 2 illustrates a microcapsule type electrophoretic display, aspects of the present application may also be used in connection with microcell type electrophoretic displays and polymer dispersed electrophoretic image displays (PDEPIDs). Moreover, although electrophoretic displays represent a suitable type of display according to aspects of the present application, other types of displays may also utilize one or more aspects of the present application. For example, rotating bichromal member displays, electrochromic displays, and polymer dispersed liquid crystal displays (PDLCD) may also take advantage of aspects of the present application, for example utilizing connectors like connectors 106a and 106b.

According to an aspect of the present application, a method of manufacturing an apparatus comprising an electro-optic display and one or more connectors of the types described herein is provided. An example is now described.

The display 102 may be fabricated by laminating the front and rear electrodes with the electro-optic layer. For example, the front electrode 108 and electro-optic layer 112 may be affixed to each other and may have a backing lamination adhesive affixed thereto. The lamination adhesive may be removed and the front plane laminate affixed to the rear electrode 110. In some embodiments, a roll-to-roll process may be used, in which the front electrode and electro-optic layer are rolled onto the rear electrode layer. Examples of this type of processing are described in U.S. Pat. Nos. 6,982,178 and 7,513,813, previously cited above. Alternative processes for making the display 102 may be used.

The display 102 may then be shaped as desired. For example, if an oval-shaped display is desired, the display 102 may be cut accordingly, using a laser, scissors, or other cutting tool. In such situations, an optional barrier layer or protective sheet, or an edge seal may be applied to the display 102 to keep out moisture. Examples of such seals are described in U.S. Pat. No. 7,649,674, which is incorporated herein by reference in its entirety.

Next, the openings in the front electrode layer 108, electro-optic layer 112, and rear electrode 110 may be formed. A laser may be used, and the power of the laser may be adjusted to form openings of different diameters. For example, the opening in the front electrode 108 and electro-optic layer 112 intended to accommodate the connector 106a may be formed using a laser operating at a first power to create an opening of diameter D3 as shown in FIG. 1B. The display 102 may then be flipped over and the laser may be used to create the opening of diameter D2 in the rear electrode 110 using a second power. The second power may be less than the first power, resulting in the opening in the rear electrode 110 being smaller than that in the front electrode 108 and electro-optic layer 112.

The openings in the front electrode 108, electro-optic layer 112, and rear electrode 110 intended to accommodate the connector 106b may be formed in a similar manner, but with the laser operated in reverse order with respect to which power level is used.

Subsequently, the display 102 and PCB 104 may be aligned and the connectors 106a and 106b may be inserted into the respective openings of the display 102 and fed through the openings in the PCB 104. The ends of the connectors 106a and 106b may be swaged with the swage tools 114a and 114b to lock them into place.

It should be appreciated that alternatives to the manufacturing process described above are possible. For example, tools other than a laser may be used to fabricate the openings. As mentioned previously, connectors other than rivets may be used, such that swaging the connectors may not be necessary or desirable.

Aspects of the present application may find application in architectural electro-optic displays. Such displays may be characterized by the desire to create a single optical state (e.g., a single color), or a limited number of optical states. Thus, such displays may include a limited number of electrodes or electrode segments. For example, the embodiment of FIG. 1A illustrates two electrodes 108 and 110. Such a configuration differs from electro-optic displays utilizing an active matrix to provide multiple pixels. Thus, sufficient electrical control of the electrodes may be provided by a small number of connectors, such as the two connectors 106a and 106b illustrated in FIG. 1A.

Figure 3:
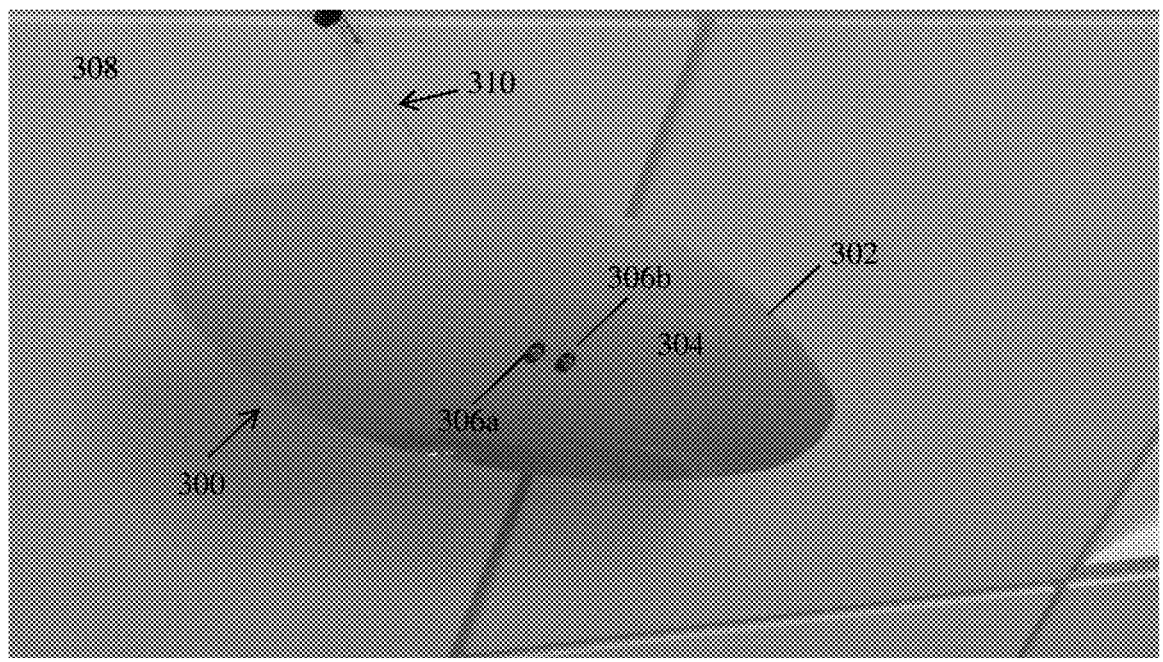
FIG. 3 is a photograph of an apparatus including an electro-optic display and two connectors of the type illustrated in FIG. 1A, according to a non-limiting embodiment of the present application.

FIG. 3 provides an example of a display used in an architectural setting, according to a non-limiting embodiment of the present application. The display 300 is shown from a viewing side, and is a display of the type illustrated in FIG. 1A. That is, the display 300 is shown from the perspective of viewing the front electrode 108 of FIG. 1A. In this embodiment, the display is suspended from a ceiling, as will be described further below.

The display 300 in this example is oval, having an oval periphery 302 and a central (or interior) portion 304. Two connectors 306a and 306b are visible in the central (or interior) portion 304 of the display 300. The connectors 306a and 306b may be of the type illustrated in FIG. 1A as connectors 106a and 106b.

As mentioned, the display 300 is suspended from a ceiling 308. In this example, the apparatus may not include a PCB mounted directly to the display, but rather the control electronics for controlling operation of the display 300 may be separated from the display by some distance. For example, in the illustrated embodiment, the control electronics may be disposed above the ceiling 308, for example behind a ceiling tile. Thus, a cable 310 may be provided. The cable 310 may both mechanically couple the display 300 to the ceiling and electrically couple the display 300 to the control electronics disposed above the ceiling 308. It should therefore be appreciated that in some embodiments a display may include connectors of the types described herein which may electrically couple with electrodes of an electro-optic display, but which may not be directly mechanically coupled with the control circuitry. In such situations, as described above, the connectors may be connected to the control circuitry by cables, wires, or other suitable components.

Aspects of the present application are not limited to displays having any particular number of connectors unless otherwise stated. For example, while the apparatus 100 of FIG. 1A and the display 300 of FIG. 3 are described as each having two connectors, displays in some embodiments may have more connectors. Each connector may effectively serve to establish the electric potential at the location of that connector. Including additional connectors may allow for creation of electrical gradients within the electrodes of the display, which in turn may allow for creation of various optical effects in the electro-optic layer of the display. Thus, any suitable number of connectors may be provided to achieve such effects. However, it may be desirable to balance the number of such connectors against the intrusion the connectors create in the display. That is, referring to FIG. 3, it is evident that the connectors 306a and 306b intrude on the display 300. Making the connectors 306a and 306b of small size reduces the intrusion, but increasing the number of connectors (for example, for the reasons described above) would increase the intrusion. Thus, there may be an upper limit to the number of connectors which may be tolerated without degrading a user's viewing experience.

Also, although the examples illustrated thus far show the connectors being located within a central or interior portion of the electro-optic display, not all embodiments are limited in this respect. In some embodiments, one or more of the connectors may be located at a periphery of the electro-optic display. In some embodiments, connectors may be positioned both in the interior of the display and at a periphery. Various combinations of connector positions may be used to allow for driving the front and rear electrodes from various positions, which may allow various visual effects to be created, such as color waves, gradients, or other visual effects.

Alternatively, one or more connectors may be connected to each front and/or rear electrode. Having one or more connection per electrode allows for control of voltage uniformity on the electrode such that more uniformity provides for a more uniform optical state while less uniformity provides for a optical state having a gradient. Moreover, one or more connections per electrode allows for different applied voltages to generate a voltage across the electro-optic layer. Varying the voltages with time relative to each other provides for the optical state having a gradient that changes with time.

Aspects of the present application may provide one or more of the following benefits. It should be appreciated that not all aspects necessarily provide each of the following benefits, and that benefits other than those listed may be provided. Some aspects of the present application provide for relatively simple mechanical connection of control circuitry to an electro-optic display. Microfabrication is not needed to achieve both mechanical and electrical interconnection. Also, the cost of the connectors of the types described herein, such as rivets and bolts, is relatively low. Such connectors may also serve as stable components for mechanical connection of electro-optic displays to surrounding structures, such as walls, ceilings, or other semi-permanent and permanent structures, as non-limiting examples.

Additionally, aspects of the present application avoid the need for a flexible connector to provide electrical control of the electro-optic display. Compared to displays which required a patterned backplane with a flexible connector tail for bending around behind the display, aspects of the present application provide resilient mechanical and electrical connection through the electro-optic display. Flexible connector tails which require bending of the electro-optic display for proper connection are prone to breaking, and can therefore damage the electro-optic display. Such drawbacks are avoided according to aspects of the present application. Also, avoiding the need for a screen printed backplane can reduce design and manufacturing time, facilitating rapid manufacture of electro-optic displays and allowing greater flexibility in creating custom displays, such as cut-to-size displays.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. An electro-optic display, comprising:
a front electrode, the front electrode having a first opening defined therein;
a rear electrode, the rear electrode having a second opening defined therein, wherein the diameter of the second opening is different from the diameter of the first opening;
an electro-optic layer between the front and rear electrodes; and
a rigid conductive component passing through the first and second openings and electrically coupled to either the front electrode or the rear electrode, but electrically isolated from the electro-optic layer.

2. The electro-optic display of claim 1, wherein the rigid conductive component is a rivet.

3. The electro-optic display of claim 1, wherein the rigid conductive component comprises a bolt.

4. The electro-optic display of claim 3, further comprising a nut coupled to the bolt.

5. The elecro-optic display of claim 1, further comprising a printed circuit board containing driver electronics configured to drive the front and rear electrodes, wherein the rigid conductive component is mechanically and electrically coupled to the printed circuit board.

6. The electro-optic display of claim 5, wherein the rigid conductive component is configured to mechanically couple the front electrode and printed circuit board in a fixed relationship with respect to each other.

7. The electro-optic display of claim 1, wherein the front electrode has a periphery and an interior portion, and wherein the first opening is defined in the interior portion of the front electrode.

8. The electro-optic display of claim 1, wherein the front electrode comprises indium tin oxide (ITO), and wherein the ITO is formed on a flexible substrate.

9. The electro-optic display of claim 8, wherein the flexible substrate comprises polyethylene terephthalate (PET).

10. A method of manufacturing an electro-optic display having a front electrode, a rear electrode, and an electro-optic layer disposed between the front and rear electrodes, the method comprising:
  creating a first opening on the front electrode having a first diameter;
  creating a second opening on the rear electrode having a second diameter, wherein the second diameter is different from the first diameter; and
  inserting a rigid conductive component through the first opening in the front electrode and the second opening in the rear electrode, the rigid conductive component being electrically coupled to either the front electrode or the rear electrode but electrically isolated from the electro-optic layer.

11. The method of claim 10 further comprising affixing the rigid conductive component to the front electrode and a printed circuit board after inserting the rigid conductive component.

* * * * *